Feb. 12, 1963  D. R. HAGG ET AL  3,077,180
MILKING APPARATUS
Filed June 15, 1959  3 Sheets-Sheet 1
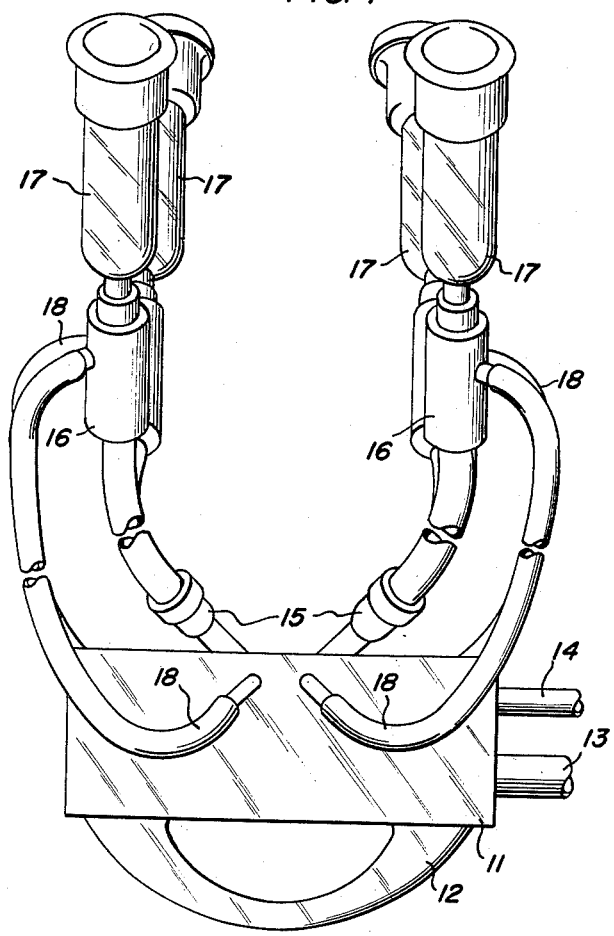
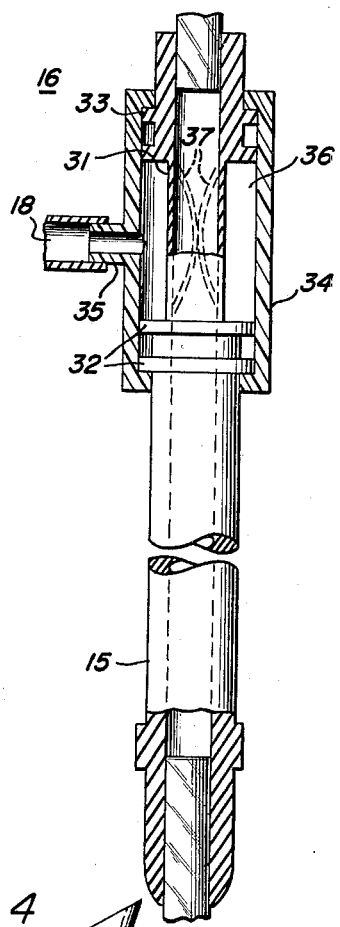
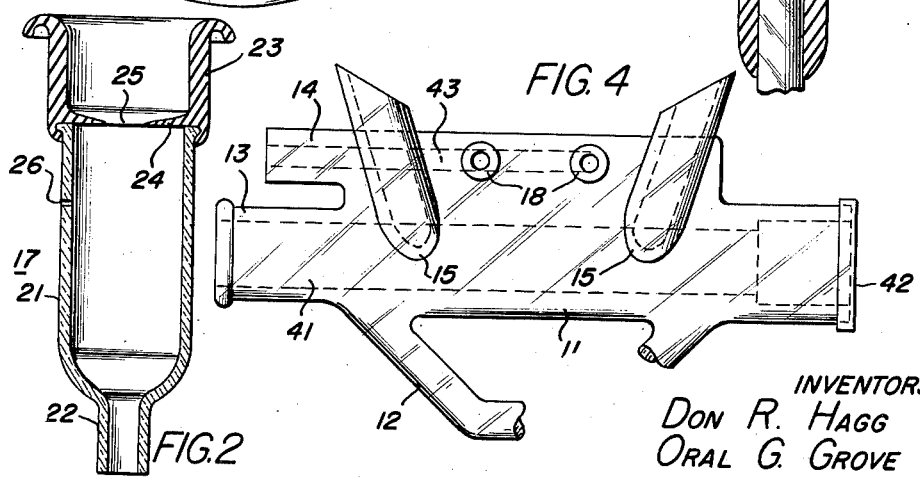
INVENTORS
DON R. HAGG
ORAL G. GROVE
BY William Grobman
ATTORNEY

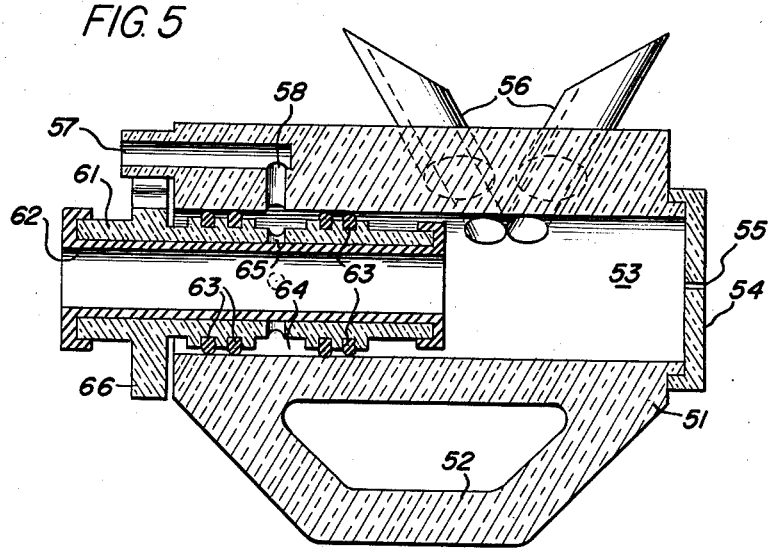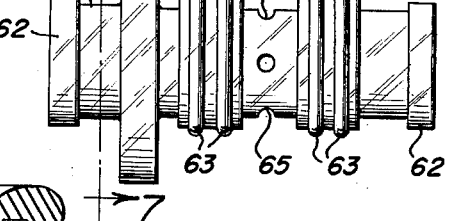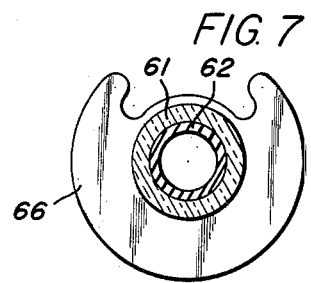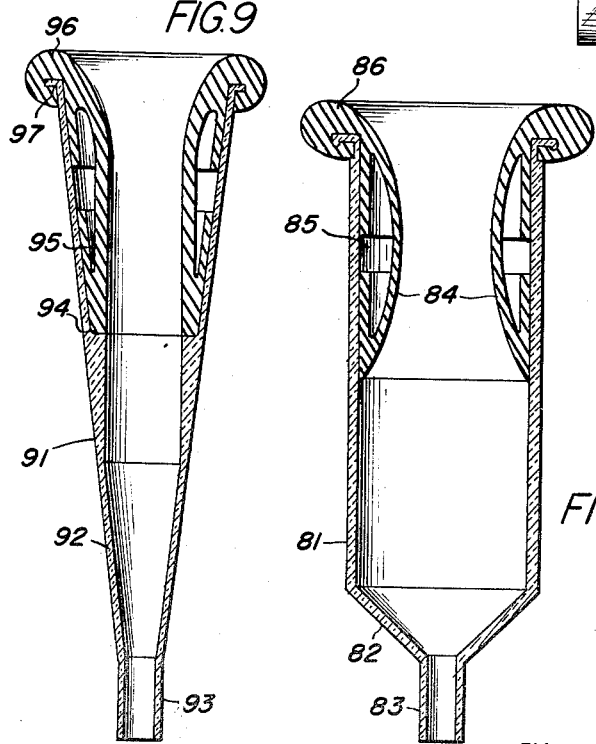

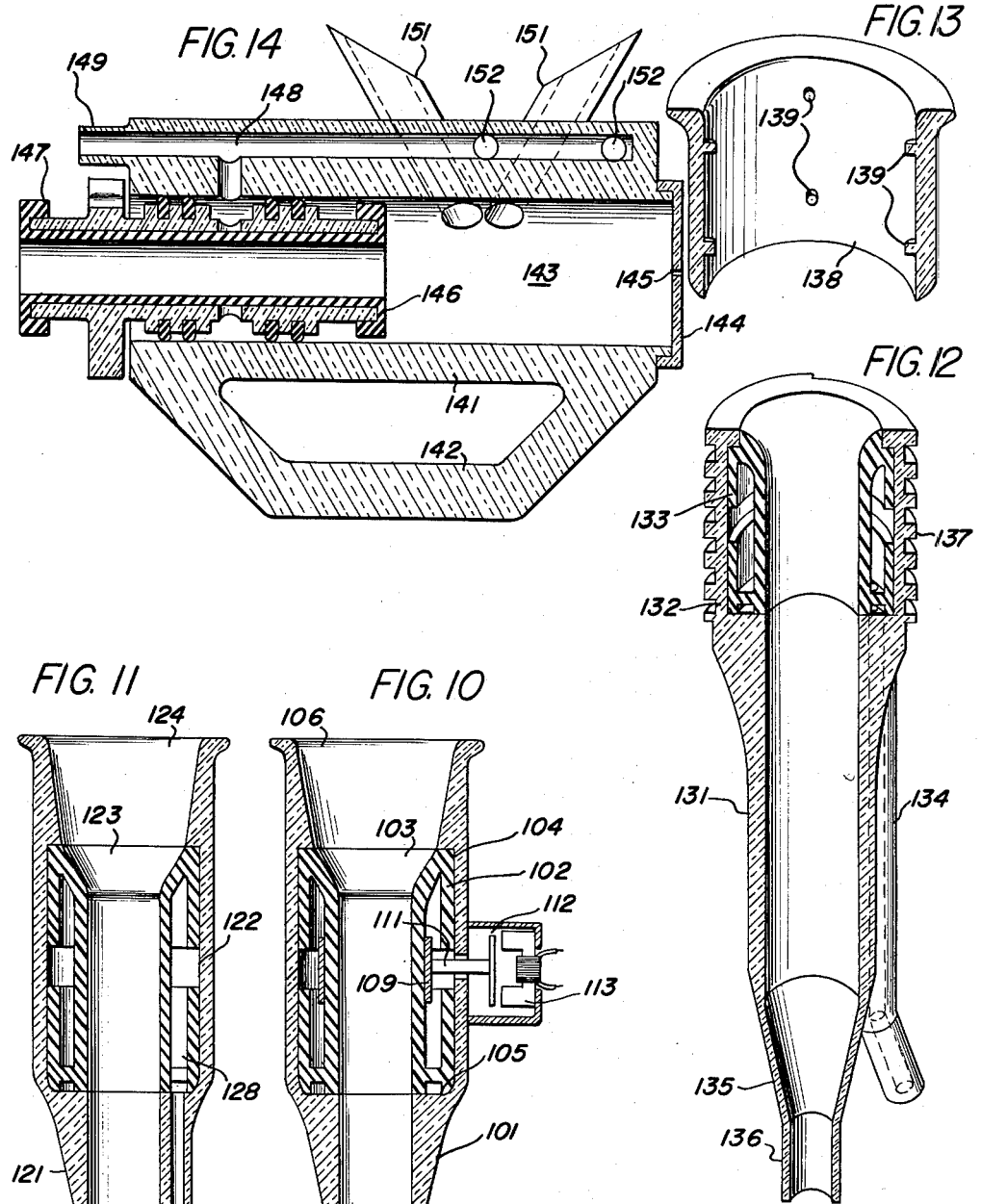

3,077,180
MILKING APPARATUS
Don R. Hagg and Oral G. Grove, Beaverton, Oreg., assignors to National Dairy Farm Equipment, Inc., Beaverton, Oreg., a corporation of Nevada
Filed June 15, 1959, Ser. No. 820,531
14 Claims. (Cl. 119—14.01)

This invention relates to milking apparatus, and, more particularly, to milking machinery which is intimately associated with the cow.

Milking machines are not new, and they have proved reasonably useful over the past 50 years. However, in spite of repeated efforts to perfect mechanical milking apparatus, such apparatus has, in many cases, proven injurious to cows. In addition, as will become evident subsequently, present equipment lack universality, and are often inconvenient and inefficient for dairymen who have no more than a few cows and to beef cattlemen, as well.

Originally, a milking machine comprised an apparatus for creating a suction upon the individual teats of a milk cow. In this manner, the valve at the end of the teat was opened, and milk was withdrawn from the udder. The suction was usually applied to the teat by means of cylindrical cups made of a rigid material with a rubber, or other suitable material, portion at the mouth to form a good seal between the cup and the teat. The bottom end of the cup was formed with a nipple to which a tube from the milk pail was attached. The constant vacuum applied to the cow through the milk pail tube proved detrimental, and over the years various efforts have been made to periodically interrupt the vacuum. One of the earliest devices incorporated, in the lower end of the milk cup, an automatic valve which was periodically closed by the vacuum and opened due to air leakage through an opening in the cup. These valves served the purpose of interrupting the constant vacuum on the cow, but they presented difficult sanitation problems which were not easily overcome. Because of the valves, which were built into the cup itself, the cups were extremely difficult to clean and required expensive machinery for the purpose.

Later, a different type of cup was introduced. This cup comprised a generally cylindrical rigid outer housing into which a rubber sleeve, or liner, was inserted. The rubber liner was fairly rigid at the upper end to provide a good seal about the cow and also at the lower end where a rubber tube was irremovably attached. The remainder of the liner was relatively soft. The rigid outer shell was provided with an opening at its bottom end through which the tube passed, and a nipple was applied to an appropriate portion, generally on the side, of the outer housing. The constant vacuum was, again, applied to the tube attached to the liner, and a pulsating vacuum was applied to the nipple which communicated with the space between the rigid outer housing and the liner. As the vacuum was applied to the inside of the liner, air entered through the nipple and into the space surrounding the liner, causing the liner to collapse about the teat of the cow. As the vacuum was intermittently applied to the space between the outer shell and the inner-lining, the inner lining resumed its normal shape and expanded, filling the rigid shell. Thus, the inner rubber lining was repeatedly collapsed and expanded about the teat of the cow.

The terms "constant vacuum" and "pulsating vacuum" will be used throughout this specification as descriptive terms. Actually, as used herein, a constant vacuum describes the reduction of the air pressure within the milk cup or other chamber to a substantially constant level, usually about ½–⅔ pound per square inch below atmospheric pressure. This is usually considered about 16" of water below atmospheric pressure. A pulsating vacuum, on the other hand, is the periodic variation of air pressure within a milk cup or other chamber from atmospheric pressure to ½–⅔ p.s.i. below atmospheric pressure. The period of the pulsating vacuum is not critical, but it normally is within the range of from 45–60 cycles per minute.

Both the application of a constant vacuum to the cow and the repeated collapse of the inner tube, or inflation tube as it is generally known, is injurious to the cow. For one thing, the application of the constant vacuum tends to draw the fluids of the mammary system from the udder to the canal portion of the teat, and hampers the blood circulation. In many instances, the cows' teats have become purplish blue in color due to the amount of blood which has been drawn into the lower end by the constant vacuum applied thereto. Also, fluids are actually drawn through the skin to the outer surface of the teats, and, when the milking cups are removed, there is often a thin film of moisture on the surface of the skin. In addition, the constant contraction and release of the teats of the cows tends to irritate them and causes rapid breakdown of the tissues. The end result of this has been a tremendous increase in the amount of mastitis which has attacked the dairy herds of this country until it has now become the main problem of the dairy industry. Although mastitis is often caused by bacteria, and is not directly caused by the use of milking machines, the irritating and breaking effects of the milking machines have provided excellent starting points for the attack of the bacteria.

In addition, because of the harmful effects and the amount of pain attendant to the use of present day milking machines, a cow which has been injured, even in the slightest, such as by being scratched by barbed wire or abraded by stones, makes mechanical milking difficult, with present day machines. Further, the cups are rigid and not adjustable in size, and difficulty is found in adapting them to different size cows. Due to the variance of the size of cow's teats, present day teat cups using inflations that collapse on the cow's teat to maintain blood circulation, work, to some degree, on long teated cows, but collapse completely below shorter teated cows.

A cow who has had but a single calf generally has short, tender, and insubstantial teats, and the use of the present milk cups on such a cow is painful to the cow. In contrast, an old, well-milked cow often has large teats, both in diameter and length, and since all dairy herds have different size cows, substantial difficulty is experienced milking with present day machinery.

Also, the present milk cups are made of a metal cup which surrounds a rubber liner, both of which are opaque. Obviously, if the use of the milking machine is both painful and injurious to a cow it is desirable to remove the milking cups as soon as possible. But since the milk cups presently used are opaque, a milker cannot tell when a quarter has been milked, but must guess, and the normal procedure is to leave the cups on the cow until he believes she is dry. This normally results in the use of the milking machine for an unnecessarily long period of time.

Since the manner in which the prior art milk cups are constructed and in which the machinery has been used results in a substantially constant vacuum inside the inflation tube, the constant air pressure on the outside of the cup tends to force the cup up on the teat of the cow until it presses into the soft membranes at the base of the udder and cuts-off the flow of milk therefrom. At the base of the udder are a myriad of small capillary tubes in which the milk is maintained in the form of tiny droplets. During the milking operation these tiny droplets pass through the capillary tubes into the milk canal in the teats where they are condensed into large drops which proceed down the milk canal and into the valve at the lower end of the teats. When the milk cup rides up on a cow until it is pressing into the tender membranes at the base of the udder, it tends to collapse these capillary tubes and prevent the proper flow of the milk droplets into the milk canal. In addition to not milking the cow satisfactorily, the collapse of these membranes is injurious to them. In order to reduce the riding-up of the cups, a pulsating vacuum has been applied to the inflation tubes, and, in addition, the weight of the entire assembly of four milk cups, tubing, and a common milk mixer (generally known as a claw) has been increased until a cow now supports about six to eight pounds when she is being milked, and on some types of milking machines this weight may be many times greater. Obviously this is neither pleasant nor helpful.

It is generally conceded by both veterinarians and dairymen that the elimination of the constant vacuum in the milking machine, the reduction in the weight of the milking assemblage, the prevention of the injury to the delicate membranes at the base of the udder, and either the elimination of the cause of drawing blood to the ends of the teats or a means for allowing the blood to return promptly to its primary location would all be beneficial to the dairy herd. It is estimated that the working life of a cow could be doubled if these dangers could be eliminated.

It is, therefore, an object of this invention to provide new and improved milking apparatus.

It is another object of this invention to provide a new and improved milk cup and claw combination.

It is a further object of this invention to provide a new and improved milking apparatus which has no harmful effects upon the cow.

It is yet another object of this invention to provide new and improved milking apparatus which performs its function effectively and rapidly without producing injury or discomfort in the cow.

Further advantages and objects of this invention will become apparent as the following description proceeds, which description should be taken together with the accompanying drawings in which:

FIG. 1 illustrates the assembly of four milk cups, a claw, and associated tubing in accordance with this invention;

FIG. 2 is a sectional view of the cup of FIG. 1;

FIG. 3 is a sectional view of the valve of the apparatus of FIG. 1;

FIG. 4 is an elevation view of the claw of FIG. 1;

FIG. 5 is a sectional view of an improved claw incorporating a valve therein;

FIG. 6 is an elevation view of the valve of FIG. 5;

FIG. 7 is an end view, partially in section taken along the line 7—7, of the valve of FIG. 6;

FIG. 8 is a sectional view of another embodiment of the milk cup of this invention;

FIG. 9 is a modification of the milk cup of FIG. 8;

FIG. 10 is a further modification of the milk cup of this invention including electric massage means;

FIG. 11 is a modification of the milk cup of FIG. 10 incorporating a pulsating air massage;

FIG. 12 is a sectional view of an adjustable milk cup providing an air massage;

FIG. 13 is a sectional view of the adjustable top portion of the cup of FIG. 12; and FIG. 14 is a sectional view of a claw in accordance with the principles of this invention which may be used with the cups of FIGS. 10, 11, and 12.

Referring to the drawings in detail, and to FIG. 1 in particular, the reference character 11 designates the body of a claw which has a handle 12 and two input tubes 13 and 14. A source of constant vacuum is connected by means of a hose (not shown) to the tube 13, and a source of pulsating vacuum, approximately equal to that of the constant vacuum, is connected to the tube 14. In general, milking machines now in operation utilize a vacuum of approximately 16 inches of water and a pulsation rate of from 45 to 60 pulses per minute and may be connected directly to the tubes 13 and 14 of the claw 11. Extending from the claw 11 at the upper portion thereof are four tubes 15, of which only two can readily be seen in FIG. 1. Each tube 15 passes through a valve portion 16 to the base of a milk cup 17. As shown in FIG. 1, there are four cups connected to a single claw, each cup being connected to the claw by its own individual tube 15 which contains its own valve 16. In addition, a line 18 of pulsating vacuum is connected to the outer sleeve of each valve 16, there being four such tubes 18 in all. The four tubes 15 connect within the claw housing 11 to a chamber to which the tube 13 is also connected, and the milk from the cups 17 passes through the tubes 15 into the chamber and out through the tube 13 to a milk pail or other milk receptacle. The pulsating vacuum applied to the tube 14 is applied inside the claw 11 to the tubes 18 which are connected to the outer portion of the valve 16.

Before discussing the operation of the assembly shown in FIG. 1 the individual components will be described in detail. Referring to FIG. 2 a milk cup 17 is shown comprising a body portion 21 of a rigid material, preferably a light weight transparent plastic material, opening into a comparatively narrow diameter tube 22 at its base and supporting on its upper end a rubber cap 23. The lower portion of the cap 23 is formed into a tapering diaphragm 24 having an opening 25 therethrough. The cap portion 23 is made of a comparatively soft material and serves to space the diaphragm 24 from the udder itself. The opening 25 in the diaphragm 24 is approximately 3/4 of an inch and is of a sufficient size to readily take the teat of a cow. As the cow's teat is inserted through the opening 25, the feathered edges of the diaphragm 24 deflect downwardly, and firmly but softly grasp the teat to form a seal therewith. The rigid portion of the cup 21 has a small opening 26 through the side wall thereof, which opening is generally in the neighborhood of .015 inch.

FIG. 3 illustrates, in partial section, the valve 16 which is in the line 15. This valve comprises a thin walled portion 31 intermediate two sets of flanges 32 and 33 of the tube 15. Surrounding the thin walled portion 31 and resting snugly against the flanges 32 and 33 is a rigid cylinder 34 having a nipple 35 in one side thereof. Between the thin walled portion 31 of the tube 15 and the rigid cylinder 34 is an air space 36 sealed against the entrance of air by the fit between the inner wall of the cylinder 34 and the outer portion of the flanges 32 and 33. A constant vacuum is applied at the lower end of the tube 15, and the pulsating vacuum is applied through the tube 18, which is connected through the nipple 35 into the air space 36. The two vacuums tend to counteract each other, and, as long as the pulsating vacuum applied to the tube 18 is present, the wall 31 remains in its normal position as shown. However, when the pulsating vacuum on the tube 18 is released, then the constant vacuum applied to the inside of the tube 15 tends to cause the wall 31 to collapse into the position shown generally by the dashed line 37. This effectively interrupts the vacuum applied through the tube 15 to the milk cup.

The claw 11, shown in detail in FIG. 4, comprises a handle 12, a straight-through chamber 41 having a cap 42 on one end thereof and being connected to the tube 13, and a second cylinder 43 connected at one end to the tube 14 and to the other end at the tubes 18. As shown, the main cylinder 41 of the claw 11 connects with the inside of the nipples 15 which, in turn, lead to the milk cups 17, and the pulsating vacuum is applied through the tube 14 and the cylinder 43 to the tubes 18 for application to the valves 16.

In operation, the sources of vacuum, which may be any standard present day milking machine, for example, are applied to the tubes 13 and 14 of the claw 11. If the pulsating vacuum were ineffective, then a constant vacuum would be applied through the tube 15 and the valve 16 to the lower end of the milking cup 17 and to the teats of the cow being milked. To avoid the effect of a continual vacuum upon the delicate membrane of the cow, the pulsating vacuum is applied through the lines 18 to the outer shell 34 of the valve 16. Periodically, at approximately 48 times per minute, the vacuum in tubes 18 is relieved, causing the wall 31 of the rubber tube 15 to collapse and to shut off the vacuum from the claw 11 to the milk cup 17. At a pulsation rate of approximately 48 times per minute, the hole 26 in the side wall of the milk cup 17 should be about .015 inch in diameter; this is sufficient to allow the air pressure inside the milk cup to rise, when the valve 16 is closed, to a vacuum of about 2 inches of water or less than 1/10 p.s.i. This is barely sufficient to keep the cups 17 from falling off the cow. A larger hole, say about .020 of an inch in diameter, would permit the air to enter the cup at too high a rate of speed, allowing the vacuum to fall off to nothing and the cups to drop from the cow. Reducing the vacuum on the cow to virtually nothing, allows the blood in the cow's teats to circulate, prevents the milk cups from continually riding up on the cow until they reach the point where they are shutting off the supply of milk, and does not pull liquids through the tissues of the cow.

In addition to the above advantages, the milk cup 17 comprises a simple, linear structure which allows easy cleaning and sterilization. From the way in which the cup 17 is designed, it is simple to send a hand or power brush through the cup in one motion without first disassembling any complex series of parts. In addition, the portion of the claw through which milk passes, the tubes 15 and the main cylinder 41, may be cleaned also by power or hand brushes, and the cylinder 41 merely by removing the cap 42 to allow a brush to pass completely therethrough. In the same manner, the valve 16 is easily cleaned using present inexpensive hand or power cleaning equipment. Since there is no tendency of the cups 17 to ride up on the cow, the weight of the entire unit may be greatly reduced. To facilitate this, it is proposed, although not necessary to this invention, that the cup 17 and the claw 11 be constructed from a clear, transparent, lightweight synthetic resin such as, by way of example, Lucite, Plexiglas, or other such acrylic resin. If the cups 17 are transparent, it becomes obvious to an operator when a quarter has stopped milking, and he may then remove the cup from that particular quarter. In addition, visual inspection of the cups 17 and the claw 11 is facilitated for sanitary reasons by using the transparent substance. A unit such as illustrated in FIG. 1 formed of such a plastic was found to weigh less than 2 pounds complete rather than the present six or more pounds of the claws and cups.

A claw which incorporates a single valve for controlling all of the four cups is illustrated in FIG. 5 and comprises a body portion 51 having a handle 52 intimate therewith. A central chamber 53 traverses the claw from one end to another and is closed off at one end by a cap 54 having a small hole 55 therethrough. Four nipples 56 (two of which are shown) extend from the claw 51 and have their central openings communicating with central bore 53 of the claw. The pulsating vacuum is applied to a small tube 57 which communicates by means of an opening 58 with a portion of the central bore 53 of the claw 51 in which is a valve illustrated also in FIGS. 6 and 7. The valve comprises a cylinder 61 of a rigid material having through the center thereof a thin-walled tube 62 of soft rubber or other suitable material. To maintain the tube 62 in position within the cylinder 61 and to keep it from moving longitudinally therein, it is overlapped about the end of the tube 61. The cylinder 61 has two pairs of O-rings 63 about its external circumference to provide an air-tight fit within the inside wall of the bore 53 of the claw 51. Between the two pairs of O-rings in a recess 64 which, when the valve is inserted in the claw 51, forms an annular air chamber. Perforations 65 are formed in the recess 64 through the wall 61 of the cylinder. To provide an easy means for removing the valve from the claw 51, a fairly large ring 66 is mounted on the outside of the cylinder 61.

In operation, the valve 62 is connected with the source of constant vacuum and provides a constant vacuum inside the bore 53 of the claw 51. This is communicated through nipples 56 and appropriate hoses to the milk cups on the cow itself. The source of pulsating vacuum is applied to the tube 57 and serves to allow the air within the air space 64 to be periodically withdrawn. So long as the pulsating vacuum is present, the rubber tube 62 retains its normal cylindrical shape, but when the pulsating vacuum becomes ineffective, the pressure difference between the inside of the valve and the annular air chamber 64 is sufficient to cause the rubber tube 62 to collapse and shut off the vacuum to the claw and to all four milk cups. The opening 55 in the cap 54 on one end of the claw 51 allows some air to penetrate the bore, and the pressure within the milk cups drops to approximately a vacuum of 2 inches. By the use of a single valve within the claw itself, the action of the valve to terminate the vacuum applied to the milk cup is greatly improved. When the source of pulsating vacuum was connected to the individual valves 16 as shown in FIG. 1 by means of rubber tube 18, the tubes 18 each tended to collapse slightly throughout their length, and this distortion, in effect, rounded off the pulsation of that vacuum which was applied to the valve. In the unit of FIG. 5, the source of vacuum is rapidly turned on or off, and, since there is virtually no rubber tubing to distort, a steep fronted pulse is applied through the openings 58 and the perforations 65 to the outside of the rubber tube 62 to cause it to more rapidly collapse and so terminate the vacuum applied to the milk cup.

It has been found that the thin diaphragm 24 of the milk cup of FIG. 2 may cause local bruising of some of the more tender cows since the entire unit is supported at a very thin edge. To avoid even that slight discomfort to the cow, the milk cup of FIG. 8 may be used. This cup comprises a rigid cylinder 81 of a suitable lightweight material having a tapered, or cone-shaped, portion 82 leading to a nipple 83 at the lower end for connection to a constant vacuum source. A rubber cushion 84, having an air space 85 therein, is inserted in the cylinder 81 to provide a large area of contact between the milk cup and the cow, and thus reduce the pressure upon the cow. A roll 86 at the upper portion of the cup 81 serves to increase the area of constant between the top portion of the cup and the lower portion of the udder to avoid any serious pressures on the delicate membranes of the udder. The basic concept of the cup of FIG. 8 is similar to that of the cup of FIG. 1, the primary difference being in the form of the seal between the cow and the cup.

Once the use of the clear, light-weight material became feasible by the design of the cups of FIGS. 1 and 8, many things were learned about milking which had not previously been known. It was found that when any of the milk cups in use today were used, the application of the constant vacuum causes ballooning of the cow's membranes below the point of contact between the cup and the cow. In other words, where there is no support for the cow, the application of the constant vacuum tends to cause a dangerous irritating swelling of the delicate membranes of the milk passages. To avoid such ballooning and to provide a constant support for the cow, the use of the milk cup illustrated in FIG. 9 becomes desirable. This cup comprises a rigid body 91 formed of a suitable transparent material and having a tapering outer surface. The lower portion 92 of the cup is tapered to a small diameter nipple 93 for connection to a source of constant vacuum. A rubber pillow 95, to provide a large area of contact between the cup and the cow, is inserted in the upper portion of the cup 91 and rests upon a shoulder 94 cut into the body of the cup. A wide roll 96 is provided on the upper portion of the pillow 95 to present a large area of contact between the cup and the udder and to avoid damaging the soft membranes thereof. The inner portion of the pillow 95 and of the body portion 91 of the cup is formed to provide a straight cylindrical tube approximately ¾ of an inch in diameter. This, it has been found, provides adequate support for the teat of a cow so to avoid ballooning, and yet provides a means by which the cow may be comfortably milked. Since the bottom portion 92 of the cup is tapered from the diameter of ¾ of an inch to a smaller diameter, that of the nipple 93, there is no way in which the vacuum applied to the cup can cause ballooning of the cow and damage to membranes in that manner. The pillow 95 is held in place on the cup by means of a flange, or rim, 97 at the top of the cup, which rim rests in an appropriate groove inside of the roll 96.

Another modification of the basic milk cup of FIG. 1 is illustrated in FIG. 10 in which the milk cup comprises a rigid body 101 of suitable material such as a transparent, lightweight synthethic resin. The inside of the body 101 is formed with a groove 102. A rubber pillow 103 is inserted in the groove 102 between internal shoulders 104 at the upper portion and 105 at the lower portion of the body 101. The pillow 103 is formed to provide a central tube approximately ¾ of an inch in diameter to match the internal diameter of the body 101. A gradually outwardly tapering upper portion 106 of the body 101 is formed above the pillow 103 and provides a means for spacing the point of contact between the cup and the cow below the udder. The lower portion 107 of the body is tapered from the ¾ inch internal diameter to a size appropriate to match that of a nipple 108 which is connected to a source of constant vacuum. The pillow 103 is hollow, and inside the hollow portion a metal or other annular rigid member 109 is provided. The annular member 109 is connected by means of a rod 111 to the moving portion 112 of an electrical vibrator which includes an electromagnet 113.

As explained above in connection with the milk cup of FIG. 9, a cup having an internal diameter of approximately ¾ of an inch for providing continual support of the teat of a cow is virtually necessary to avoid ballooning and damaging of her delicate membranes. The pillow 103 and the internal bore of the body 101 is approximately that diameter and continues along in a smooth, substantially unbroken surface to provide the needed support. The upper portion 106 is provided as a spacer to remove the point of contact, which is the pillow 103, from the udder as far as possible. Since only the lower half inch of the cow's teat is required to milk it, it is preferable to move the vacuum as far down on the teat as possible. This subjects a smaller amount of the cow to the deleterious effects of the vacuum and provides less of the cow's organs to be adversely affected. In addition, it has been found that a gentle massaging of the cow while she is being milked helps soothe even the balkiest of cows and helps stimulate her in a manner similar to that of washing her. The vibrator 112, which vibrates the ring 109 about the inner portion of the pillow 103, provides this gentle massage for the cow. The amount of movement of the members 109, 111, and 112 is very slight and is not sufficient to cause any real danger.

A structure similar to that of FIG. 10, without the weight which the electric massager adds to the milk cup assembly, is illustrated in section in FIG. 11. The cup of FIG. 11 comprises a rigid body member 121 of a suitable material such as a transparent synthetic resin having a thin walled portion 122 into which a hollow pillow 123 of resilient material is inserted. An upper portion 124 of the cup 121 is provided to contact the udder of the cow and to maintain the point of contact between the cow and the cup as low on the teat as possible. The lower portion 125 of the cup is tapered down to the size of a nipple 126 to which a source of constant vacuum is applied. A second tube 127 is formed in the body of the cup 121 to provide communication with the air space in the hollow pillow.

The operation of the milk cup of FIG. 11 is similar to that of FIG. 10. The comparatively small internal diameter (¾") of the cup 121 provides proper support for a cow while she is being milked, and the upper portion 124 keeps the point of contact between the cow and the pillow 123 far down on the cow's treat. The tube 127 is connected to a source of pulsating vacuum which is communicated to the hollow portion 128 of the pillow 123 to slightly vibrate the pillow and gently massage the cow as she is being milked. The effect of the pulsating vacuum applied through the tube 127 to the hollow portion 128 of the pillow 123 is small to avoid the effects of a collapsing or tightening member about the teat of the cow. Whereas the movement of the walls of an inflation cup in present day milkers is about ½ inch, the maximum amount of vibration or wall displacement in the pillow 123 of the cup of FIG. 11 should be in the order of ⅛ of an inch. In this manner, there is no injury to the delicate organs. By using the already available pulsating vacuum for massage purposes, the heavy weight of an iron core vibrator such as that of FIG. 10 can be eliminated without eliminating the beneficial results. At the same time, the danger of possible shocking of the cow is avoided.

One of the major defects of mechanical milkers thrughout the years has been the inability of a single milk cup to fit comfortably the varying sizes of cows. There is a vast amount of difference between an old cow which has been milked for years and a young heifer which has only borne her first calf. Recent research has indicated that the smaller the amount of the teat subjected to vacuum, the less the irriation, and since only the last ½ inch of the teat is necessary for milking purposes, a milk cup of the type illustrated in FIGS. 12 and 13 is most suitable for all sizes of cows' teats. The effect of the weight of the present day milking apparatus on a cow's udder tends to break down her udder and teat tissues at a much higher rate and at an earlier age due to the alternate ballooning and collapsing of the teat and the continual application of a constant vacuum. This constant vacuum and the ballooning are factors which contribute to the enlargement of cows' teats. The reduced weight and the removal of the constant vacuum permitted by the equipment of this invention goes far toward reducing the enlargement of cows' teats.

The cup of FIG. 12 comprises a rigid body portion 131 of substantially constant internal diameter with a grooved upper portion 132. The body 131 may be formed of any suitable material such as a transparent synthetic resin. A pillow 133, preferably of rubber or other such soft material not affected by milk or cleaning solutions, is inserted in the groove 132 in the upper portion of the cup. A tube 134 communicates wiith the internal hollow portion of the pillow 133 to provide massaging pulsations thereto. The lower portion of the cup 131 is tapered to the size of a nipple 136 which can be connected to a source of constant vacuum and a series of threads 137 is provided on the outside of the upper portion of the cup 131. A cap portion 138, illustrated in section in FIG. 13, is adapted to fit over the upper portion of the cup 131 and is provided with internal projections 139 adapted to ride within the thread 137.

In this manner, an adjustable cup for milking cows is provided, which cup tends to keep the seal from the base of the cow's udder. This is particularly necessary on cows with long, narrow teats. The upper portion is longitudinally adjustable on the cup itself so that the effective length of the cup is varied and it may be used not only for the average size cow, but comfortably and effectively for either large or small teated cows.

The cups of FIGS. 11 and 12 require a claw which also supplies pulsating vacuum to the individual cups. Such a claw is illustrated in FIG. 14 and comprises a main body portion 141 having a handle 142 and an internal bore 143. One end of the bore 143 is closed by a cap 144 having a small hole 145 therethrough. A valve 146, of the same general construction as the valve of FIGS. 5, 6 and 7, is inserted in the other end of the bore 143, with its external portion adapted for connection to a source of constant vacuum. A second bore 148 within the claw 141 is connected to a nipple 149 for connection to a source of pulsating vacuum. Nipples 151 communicate with the main bore 143 and serve to connect the constant vacuum to each of the individual milk cups. Nipples 152 communicate with the bore 148 and provide the pulsating vacuum for the pillows of the cups of FIGS. 11 and 12.

The operation of the claw of FIG. 14 is similar to that of FIG. 5 except that the source of pulsating vacuum is connected to only a single tube 148 to provide the pulsations necessary both for operating the valve 146 and for operating the four massaging pillows 133 of the milk cups. By providing only a single tube in the claw 141 for the pulsating vacuum, the amount of the effective pulsation has been reduced to the point where the pillows of the cups do not move the same as the inflation tubes in prior milk cups. There is not sufficient capacity in the vacuum available for the inside of the pillows of the milk cups to cause them to collapse and expand. Since the change in vacuum available is comparatively small, only a small vibration is provided. The hole 145 in the cap 144 of the claw 141 allows enough air to enter the four cups during the period when the valve 146 is closed to reduce the amount of vacuum in the cups from approximately 16 inches of water to about 2 inches of water, or enough to maintain the cups in position and to keep them from falling off.

This specification has described a new and improved milking apparatus which has as its primary function to relieve the constant vacuum which has heretofore been applied to the cow's teats during milking. By eliminating this constant vacuum at least a portion of the time, the blood which has been pulled to the surface of the teats was allowed to flow back into its capillaries and resume its normal position, and the other fluids of the cow's udder and teats are not drawn through the surface of the skin. In addition, the point of contact between the cow and the cup has been moved down appreciably, removing the danger of collapsing the delicate capillaries in the base portion of the udder and subjecting only the smallest portion of the teats to the actual milking vacuum. Further, this invention has provided apparatus which is much lighter in weight than prior art devices and provides a smaller load on the cow while, at the same time, neither crushing nor ballooning her. Apparatus made according to the principles of this invention has been used successfully and has milked cows with scratches and bruises on their teats without the cows lifting a leg. There has been no discomfort or damage to any of the cows' organs or membranes. By the same token, milking proceeded at the same rate, or better, as would be accomplished by any of the present day harmful milking machines. It is understood, of course, that this specification may suggest other forms of invention to those skilled in the art and it is, therefore, intended that this invention be limited only by the scope of the appended claims.

What is claimed is:

1. A milking apparatus comprising at least one teat cup of substantially rigid material and having a substantially cylindrical interior contour with a vent opening through a side thereof, a first vacuum line connected to said teat cup, said first vacuum line having a restricting valve therein, a second vacuum line operatively connected to said restricting valve, constant vacuum means connected to said first vacuum line, and intermittent vacuum means connected to said second vacuum line.

2. The apparatus defined in claim 1 wherein said cup comprises a soft resilient cushion positioned within the interior of said cup to form a seal with a teat, said cushion being generally cylindrical in shape and extending along at least a portion of the interior length of said cup.

3. The apparatus defined in claim 2 wherein said cushion is formed to provide a sealed space between the outer wall of the cushion and the inner wall of said cup, and further including means for gently vibrating said cushion from said sealed space.

4. A milking apparatus comprising at least a plurality of teat cups each of substantially rigid material and having a substantially cylindrical contour with a vent opening through a side thereof, said plurality of cups comprising a group individual to a single animal being milked, each cup having a first vacuum line connected thereto, a restricting valve connected to the first vacuum lines of a group of cups, a second vacuum line operatively connected to said valve, means for connecting said first vacuum lines to a source of constant vacuum, and means for connecting said second vacuum line to a source of intermittent vacuum for intermittingly operating said valve.

5. The apparatus defined in claim 4 further including a milk receiver common to all of the cups of said group, said valve means being supported in operative relation with said milk receiving means.

6. The apparatus defined in claim 4 wherein each of said cups further comprises a soft resilient cushion, said cushion being mounted within said cup and spaced from the inner wall thereof.

7. A milking apparatus comprising a group of teat cups, each of which cups is formed of a substantially rigid material in a substantially cylindrical contour, each of said cups having a first open end adapted to fit over the teat of an animal being milked and the other end open but with a smaller diameter, a first vacuum line connected to said other end, a restricting valve connected to said first vacuum line to close said first line when said valve is operated, a milk receiver common to the cups of said group, each of said first vacuum lines being connected to said milk receiver, a second vacuum line operatively connected to said valve to operate said valve, means connecting said first vacuum line to a source of constant vacuum, and means for connecting said second vacuum line to a source of intermittent vacuum to intermittently operate said valve.

8. The apparatus defined in claim 7 wherein each of said cups has a vent in the side wall thereof to permit the entry of air and the rise of pressure within the cup whenever said valve is operated.

9. The apparatus defined in claim 7 wherein said valve means is common to all of the cups of a group and wherein said valve means is mounted in operative relation with said milk receiver.

10. A milking apparatus comprising at least one teat cup of substantially rigid material and having a substantially cylindrical interior contour with a vent opening through a side thereof, said cup having an interior resilient cushion mounted within said rigid cup to provide a seal between the animal being milked and the cup, said cushion extending over a portion of the longitudinal length of said cup and being so proportioned that only the tip of the teat being milked extends below it, a first vacuum line connected to said cup in operative communication with the interior of said cup, a restricting valve connected to said first vacuum line to close said line when said valve is operated, a second vacuum line operatively connected to said valve, means for connecting said first vacuum line to a source of constant vacuum, and means to connect said second vacuum line to a source of intermittent vacuum.

11. The milking apparatus defined in claim 10 wherein said cushion in said cup is spaced throughout a portion of its length from the inside wall of said cup to provide an air space therebetween, said cushion being restrained from movement in a longitudinal direction.

12. The milking apparatus defined in claim 11 further comprising a third vacuum line, and means to connect said third vacuum line in communication with said air space.

13. The milking apparatus defined in claim 12 further comprising means for connecting said third vacuum line to a source of intermittent vacuum which supplies a vacuum sufficient to vibrate said cushion without permitting it to collapse.

14. A milking apparatus comprising at least one teat cup of substantially rigid material and having a substantially cylindrical interior contour with a vent opening through a side wall thereof, a soft resilient cushion positioned within said cup to form a seal with the teat of an animal being milked, said cup having an increased interior diameter over the portion of its longitudinal length covered by said cushion to form an interior surface with said cushion having substantially a constant daimeter, said cushion being restrained from longitudinal movement, a first vacuum line connected to the interior of said cup, a restricting valve connected to said first vacuum line to close said line when said valve is operated, a second vacuum line operatively connected to said valve, means for connecting said first vacuum line to a source of substantially constant vacuum, and means for connecting said second vacuum line to a source of intermittent vacuum.

References Cited in the file of this patent

UNITED STATES PATENTS

| | | |
|---|---|---|
| 948,440 | Berberich | Feb. 8, 1910 |
| 1,113,942 | Anderson | Oct. 20, 1914 |
| 1,196,000 | Leitch | Aug. 29, 1916 |
| 1,255,186 | Leitch | Feb. 5, 1918 |
| 1,430,191 | Rutherford | Sept. 26, 1922 |
| 1,522,680 | Hapgood | Jan. 13, 1925 |
| 1,705,293 | Horthy et al. | Mar. 12, 1929 |
| 2,018,713 | Erling | Oct. 29, 1935 |
| 2,612,136 | Davis | Sept. 30, 1952 |
| 2,696,194 | Perkins | Dec. 7, 1954 |
| 2,744,496 | Roben | May 8, 1956 |

FOREIGN PATENTS

| | | |
|---|---|---|
| 621,883 | France | Feb. 14, 1927 |